United States Patent
Breen

(10) Patent No.: US 7,493,211 B2
(45) Date of Patent: Feb. 17, 2009

(54) SYSTEM AND METHOD FOR UPDATING GEO-FENCING INFORMATION ON MOBILE DEVICES

(75) Inventor: Thomas B. Breen, Broomall, PA (US)

(73) Assignee: General Electric Company, Schenectady, NY (US)

(*) Notice: Subject to any disclaimer, the term of this patent is extended or adjusted under 35 U.S.C. 154(b) by 25 days.

(21) Appl. No.: 11/303,394

(22) Filed: Dec. 16, 2005

(65) Prior Publication Data
US 2007/0143013 A1 Jun. 21, 2007

(51) Int. Cl.
G01C 21/00 (2006.01)
G06F 17/00 (2006.01)
G08G 1/123 (2006.01)

(52) U.S. Cl. .......... 701/207; 701/300; 340/995.12; 340/995.18; 342/357.08

(58) Field of Classification Search .......... 701/117, 701/200, 205, 206, 207, 208, 213, 300; 340/988, 340/989, 991, 992, 995.12, 995.14, 995.18; 455/456.1, 456.5; 342/357.06, 357.07, 357.08, 342/457
See application file for complete search history.

(56) References Cited

U.S. PATENT DOCUMENTS

| | | | |
|---|---|---|---|
| 5,223,844 A * | 6/1993 | Mansell et al. | 342/357.07 |
| 5,612,875 A * | 3/1997 | Haendel et al. | 701/35 |
| 5,825,283 A | 10/1998 | Camhi | |
| 5,917,433 A * | 6/1999 | Keillor et al. | 340/989 |
| 5,959,577 A | 9/1999 | Fan et al. | |
| 6,342,847 B1 | 1/2002 | Archuleta et al. | 340/988 |
| 6,353,390 B1 | 3/2002 | Beri et al. | 340/572.1 |
| 6,721,652 B1 | 4/2004 | Sanqunetti | 701/207 |
| 6,832,153 B2 * | 12/2004 | Thayer et al. | 701/207 |
| 7,164,986 B2 * | 1/2007 | Humphries et al. | 701/207 |
| 2002/0180618 A1 | 12/2002 | Beri et al. | 340/988 |
| 2002/0184236 A1 | 12/2002 | Donath et al. | 707/104.1 |
| 2003/0060938 A1 | 3/2003 | Duvall | |
| 2003/0149526 A1 | 8/2003 | Zhou et al. | 701/213 |
| 2004/0034470 A1 | 2/2004 | Workman | 701/213 |
| 2004/0193368 A1 | 9/2004 | Sanquenetti | 701/207 |
| 2005/0017855 A1 | 1/2005 | Harvey | 340/426.1 |
| 2005/0128074 A1 | 6/2005 | Culpepper et al. | 340/539.1 |
| 2005/0149251 A1 | 7/2005 | Donath et al. | 701/200 |

* cited by examiner

Primary Examiner—Jack W Keith
Assistant Examiner—Edward Pipala
(74) Attorney, Agent, or Firm—Drinker Biddle & Reath LLP

(57) ABSTRACT

A system and method of automatically replacing the geographic location of geo-fences stored in memory of a telematics system is described. The location of an asset is determined using an on-board telematics device with a location device. The location of the asset is compared with the location of predefined geo-fences stored in memory on the asset. When the asset is located within a geo-fence which triggers the replacement of geo-fences, the telematics system causes the asset to receive a new set of geo-fences, which replace the existing set of geo-fences in the telematics system memory. The operational cost of the system is reduced by minimizing communications charges when a reduced number of transmissions is needed to replace geo-fences stored in memory on the asset.

23 Claims, 4 Drawing Sheets

SYSTEM AND METHOD FOR UPDATING GEO-FENCING INFORMATION ON MOBILE DEVICES

FIELD OF THE INVENTION

This invention relates to a system and method of use of geo-fences with mobile assets, and more particularly in providing a system and method of automatically updating the geo-fences stored in memory of a device located on the asset.

BACKGROUND OF THE INVENTION

Companies that use large fleets of vehicles are subject to misuse or theft of their fleet vehicles. For example, it is likely that some vehicles in a large fleet will be used by employees without authorization or will at least occasionally be subject to theft. Even employees who are authorized to use a vehicle for some purposes may, in some instances, deviate from an authorized route or otherwise make an unauthorized use of the vehicle. One way to reduce these problems is to install a monitoring system to track the location of vehicles in a fleet. Such telematics devices can enable a fleet manager to monitor the location of vehicles in the fleet to determine when they are located in un-authorized areas, or are being used at un-authorized times.

Locating, tracking and monitoring protocols are available for use in conjunction with physical boundaries and fences, as necessary, to locate, track and monitor the location and proximity of an object relative to the physical boundary. Although locating an object to be tracked may be achieved using transmitter/receiver-based technology, these types of systems have proven to be limited in their application. It becomes increasingly difficult and expensive to monitor and track an object the larger the circumscribed area becomes. Monitoring also becomes increasing difficult in an area with challenging topographical terrain.

Several solutions to the problem of tracking and monitoring objects to be tracked have been tried or implemented with varying levels of success. Widely used procedures for monitoring the movement of fleet vehicles involve the use of geofencing, or establishing an electronic boundary around areas of interest. Systems have been established for the detection of the theft of vehicles while they are stopped at a customers location, or at a central location such as a distribution point. In some systems the operator of the vehicle manually activates a geo-fence when the vehicle stops at a customer location. Activation of the geo-fence provides a zone, often of a set radius, around the location of the vehicle when the geo-fence is activated. Activation of the geo-fence causes a geo-locator, such as Geographic Positioning System (GPS) receiver, to turn on. While the geo-fence is activated the geo-locator determines the location of the asset on a scheduled basis and can transmit the location to a central station, where a determination is made a to whether the vehicle moves outside the geo-fence. Problems with such a system include the need for manual activation and the costs associated with transmitting location information from the asset to a central station when the geo-fence is activated. Alternatively the geo-locator can be linked with a processor on the asset where the processor determines whether the vehicle moves outside the geo-fence. Such an occurrence triggers the processor to send a message to the central location indicating that the vehicle moved through the geo-fence. This system reduces operating costs by limiting the sending of messages to those times when a geo-fence is crossed. However, this system does not address the physical limitations associated with storing geo-fences on an asset, and does not address the updating of geo-fence information on an asset.

To overcome the need to manually activate a geo-fence, systems were developed where pre-defined geo-fences were established around facilities of the fleet owner and the customers, and transportation routes between the facilities. While this makes it possible to monitor the location of a vehicle throughout the day, many additional messages would need to be sent because of the increased special coverage.

In order to reduce costs associated with sending and receiving messages, systems were developed where the geographic locations of a limited number of geo-fences were stored in memory on the asset and a processor on the asset determines whether the vehicle moves outside the geo-fence. Movement outside or through a geo-fence triggers the processor to send a message to the central location indicating that the vehicle moved through the geo-fence. A limitation of this system is that the geographic location of only a limited number of geo-fences can be stored in the memory of an asset. When geo-fences are needed that are not stored in memory on the asset, additional messages must be sent and received to obtain the geographic location of new geo-fences. In many wireless communications system charges are incurred for each message sent or received. Therefore significant charges can accrue when an asset moves among many geo-fences and their locations need to be placed or removed from memory on the asset.

Accordingly, there is a need for a system and method of automatically and cost effectively updating the geo-fences stored in memory of a device located on the asset.

SUMMARY OF THE INVENTION

Accordingly, the present invention is directed to a system and method of using geo-fences to monitor the location of mobile assets, where a set of geo-fences are stored in a memory device on the asset and are automatically replaced with the new set of geo-fences which are related to the travel path taken by the asset or facilities to be visited by the asset. This system and method substantially obviates one or more of the problems due to limitations and disadvantages of the related art.

An object of the present invention is to provide a system and method of using geo-fences to monitor the location of mobile assets, where the geographic locations of a set of geo-fences are stored in a memory device on the asset and are automatically replaced with a new set of geo-fences which are related to the travel path taken by the asset or facilities to be visited by the asset, where operating costs are reduced due to reduced transmissions between communications system on the asset and a central station.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a system is provided that stores a set of geo-fences in a storage device on the asset and automatically replaces these geo-fences with a new set of geo-fences based on the current location of the asset. The system can also store operational information associated with each geo-fence in the storage device on the asset and can provide alerts when an asset is located in an unauthorized location.

It is to be understood that both the foregoing general description and the following detailed description are exemplary and explanatory and are intended to provide further explanation of the invention as claimed.

DETAILED DESCRIPTION OF THE PREFERRED EMBODIMENTS

Reference will now be made in detail to an embodiment of the present invention, example of which is illustrated in the accompanying drawings.

Figure 1:
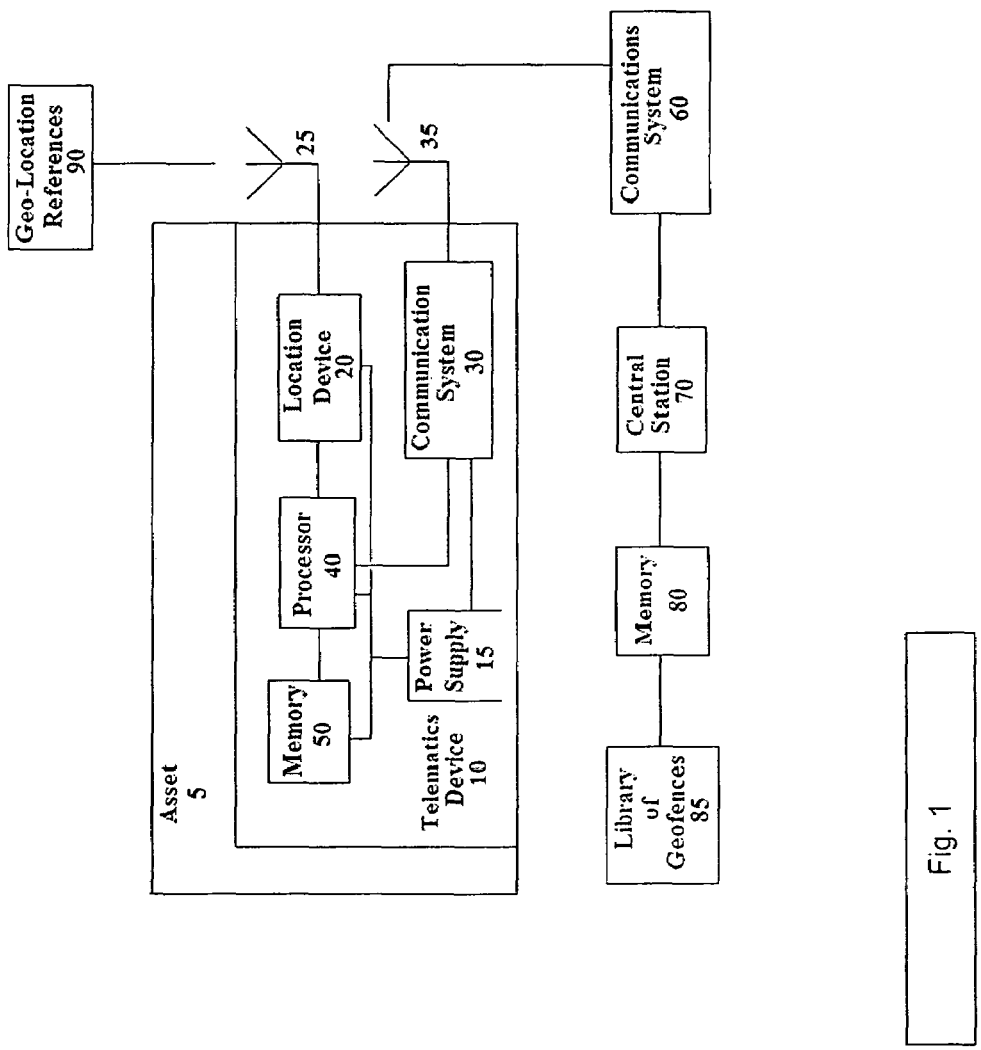
FIG. 1 is a block diagram representation of the monitoring and tracking system of an embodiment of the present invention.

FIG. 1 illustrates a block diagram of a representative system for monitoring the location of an asset 5. The system includes an asset 5 containing a telematics device 10. Telematics device 10 may include the following components: a power supply 15, a location device 20, communications system 30, processor 40 and a memory 50, where each of the components is linked to the power supply, or contains its own power supply when modular components are used. Location device 20 is connected to antennae 25 to receive signals from geo-location references 90, such as satellites. Communications system 30 is connected to antennae 35 to communicate through a communications system 60 to the central station 70 which is linked to memory 80, which contains a library 85, or database, of geo-fences, which may also contain information (such as operating parameters) associated with each geo-fence.

Asset 5 represents a vehicle, trailer, or other device for which a position is to be monitored. Telematics device 10 may be single unit which contains all of the components, or individual components, or groups of components, linked together. Power supply 15 may include fuel cells, dry cells, or other types of battery, and may include at least one solar cell or other energy harvesting device and associated hardware and or software to power the devices or recharge of the battery. Power supply 15 can also include voltage and/or current regulatory circuitry to supply power to other components in telematics device 10. When telematics device 10 contains an individual component, that component may contain its own power source or be linked to power supply 15.

Location device 20 is a position determining system, such as the Global Positioning System (GPS), Differential GPS (DGPS), Eurofix DGPS, and the Global Navigation Satellite System (GLONASS). Importantly, the present invention is well-suited to use any position determining system (both terrestrial and satellite based) as well as future systems that may be developed, and is not dependent on the use of a particular system. Location device 20 can receive signals from external geo-location references 90, such as satellites, through antennae 25. In one embodiment, location device 20 is part of, or integrated with, the transceiver or receiver of the communications system 30, although location device 20 can also be a separate device specifically for determining the location of the asset 5, or can be a receiver integrated within the telematics device 10. The antenna 25 for the location device 20 may be integrated into the location device 20 or it can be a separate component linked to location device 20 either directly or through linkages in the telematics device 10. In an embodiment, the position of the vehicle can be determined using another type of locating system, such as a system of terrestrial towers that transmit signals to and/or receive signals from a receiver/transmitter located in or on the vehicle. Such a system can use propagation times between the vehicle and the terrestrial towers to triangulate the vehicle's position. This type of triangulation system can be implemented, for example, using a cellular telecommunication infrastructure.

Communications system 30 is any wireless system located on the asset which is linked to processor 40 and allows two-way communications between the telematics device 10 on the asset and a central station 70 and may use a communication system 60. The antenna 35 for the communications system 30 may be integrated into the communications system 30 or be a separate component which is linked to communications system 30 either directly or through linkages in the telematics device 10.

Processor 40 can be part of an embedded device (e.g., an onboard computer with limited functionality) or can be a general use processor that is part of the asset 5. The processor 40 is linked to power supply 15, location device 20, communications system 30 and memory 50. Memory 50 may be any device, including magnetic, optical or solid-state memory, where information stored in the device may be changed by the user. Memory 50 is used to contain a set of geo-fences 130 and information 150 (such as operating parameters) associated with each geo-fence Communication system 60 can be a public or private wireless network that allows two way communications between the communications system 30 in telematics device 10 on the asset 5 and central station 70. Communications system 60 and communications system 30 are compatible for transferring data on geo-fences and associated information between central station 70 and processor 40 on asset 5.

Telematics device 10 is capable of operating in various modes, depending upon information associated with the geo-fence 150 within which asset 5 is located. Information associated with each geo-fence 150 may include, but is not limited to, operating parameters such as frequency of determining the locating the asset; determining if notification of central station 70, or some other contact is required; contingency actions 160 to be taken when the asset is determined to be outside of a geo-fence. Specific examples of these types of information include: the rate of determining the location of the asset 5 may be higher when the asset 5 is moving between facilities compared to when it is located at a facility; notification of a facilities manager when an asset 5 enter a geo-fence whose border is some distance from the facility, thereby providing time for personnel and equipment at the facility to be prepared for arrival of the asset 5; and having the contingency action change from sending notification to the central station when an asset is a short distance outside a geo-fence to sending notification to the central station and law enforcement when the asset is a further distance outside the geo-fence. A fleet manager can also establish through use of associated information 150 whether a vehicle reports its location to central station 70 and/or the customer when entering or leaving certain geo-fences. In addition to routine tracking for security, this feature could provide advanced notification of the arrival of the vehicle so that the appropriate personnel are available in a timely manner at the vehicles next destination to handle cargo or other items on the vehicle.

Importantly, operating parameter data can include parameters that control any aspect of the operation of the telematics device. Thus, operating parameters can be used to control the operation of sensors (not shown) that are connected to it that sense various conditions of the asset. Those sensors include, but are not limited to, thermometers to sense the temperature of the asset or the temperature of a part of the asset such as wheel bearings, motion sensors to sense whether the asset is in motion, door sensors to sense the position of doors or hatches on the asset, valve condition sensors to sense the condition of valves on a tank car, impact sensors to measure any impact to the asset, speed sensors to measure the speed of the asset, accelerometers to measure the acceleration of the asset, and content sensors to determine the presence of material in an area, such as a cargo in a trailer. In addition, other data can be determined or extracted from data measured with sensors, including maximum and minimum temperature, maximum and minimum speed, total time stopped (using a clock in addition to the motion sensor), total time moving, and average speed.

The operating parameter data could include information indicating the rate or time at which the telematics device should take readings from the various sensors, and could also include information indicating the rate or time at which the telematics device should transmit sensor information to the central station. For example, in one embodiment, the operating parameter data for a geo-fence could include data that directs the telematics device to measure the speed of the asset within that geo-fence periodically. This embodiment could be used in geo-fences covering interstate highway areas where there is a higher chance that the asset will be driven at excessive speed. In another embodiment, the operating parameter data for a geo-fence could include data that directs the telematics device to transmit information concerning any change in the status of the door sensor. This embodiment could be used in geo-fences covering areas where the doors of the asset are not expected to be opened or closed. The operating parameter data can include data that controls any aspect of the operation of the telematics device and associated sensors.

The operating parameter data can also include rules that should be applied to the data received by the telematics device when it is in the area defined by a particular geo-fence, can include data that is used by rules that are already stored in the telematics device, or can include data that directs the telematics device to use a particular rule that is stored within the telematics device within the area defined by a particular geo-fence. For example, the operating parameter data may provide that the telematics device should monitor speed using a speed sensor when the asset is within a particular geo-fence. The operating parameter data may also provide that the measured speed should be compared to a threshold speed using a rule, and that if the measured speed exceeds the threshold speed, an alert message is generated by the telematics device and transmitted to the central station. In one version of this embodiment, the rule is already within the memory of the telematics device, and the operating parameter data includes data that directs the telematics device to measure speed and to apply the rule within the geo-fence. The operating parameter data may also include the threshold speed that should be used for the rule, or the threshold speed may already be set within the telematics device. In another version of this embodiment, the rule is not already within the memory of the telematics device, and the rule is one of the operating parameter data that is associated with a geo-fence when it is updated.

Central station 70 can be any facility capable of two way communications with communications system 30 in telematics device 10 on the asset 5 and linked to memory 80 containing a library 85 of geo-fences and information 150 (such as operating parameters for the telematics device) associated with each geo-fence. Memory 80 can be any device, including magnetic, optical or solid-state memory, where information stored in the device may be changed by the user.

Geo-location references 90 utilized will depend upon the location device 20. When A GPS receiver 20 is used, the geo-location references 90 will comprise a portion of the set of GPS (also known as NAVSTAR) satellites. In other types of geo-location systems, geo-location references 90 could be cellular communication towers, or other locations/system which provide reference points utilized by location device 20.

Figure 2:
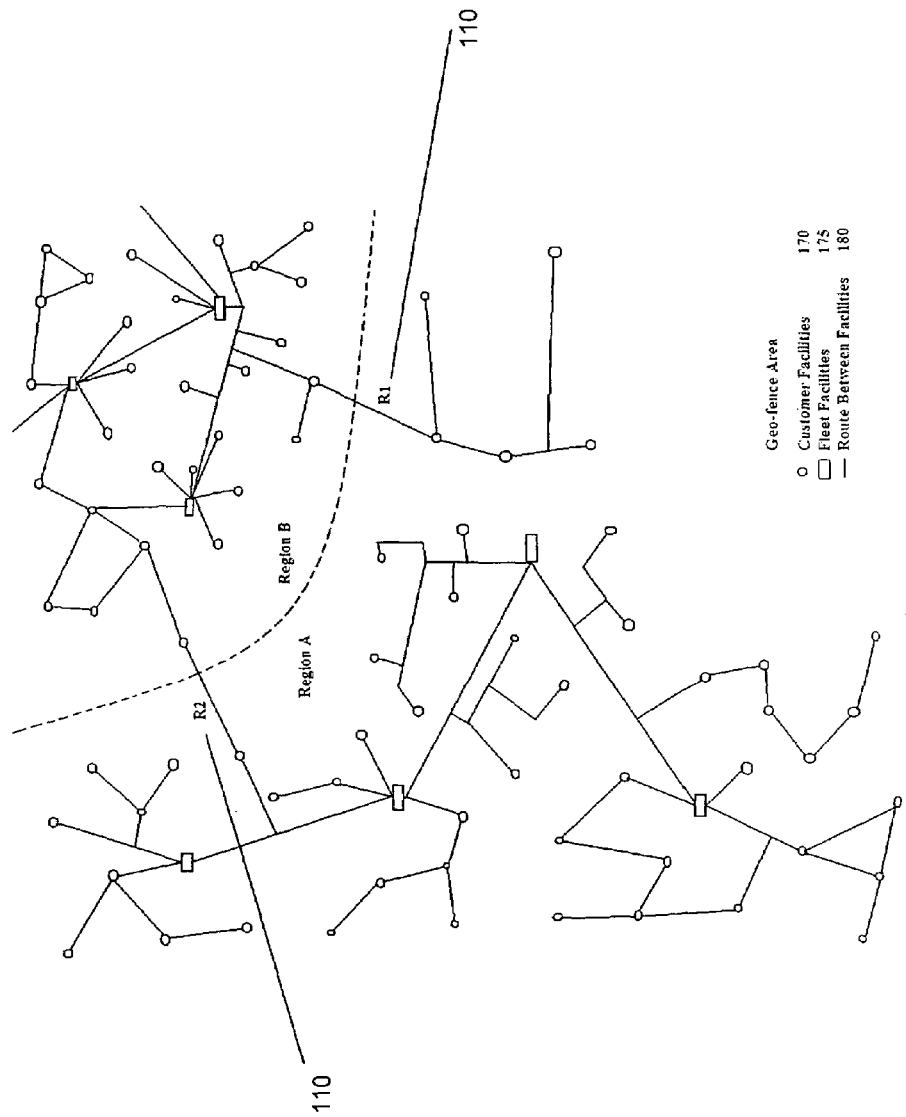
FIG. 2 is an exemplary map showing the use of geo-fences and the designation of a trigger geo-fence in an embodiment of the present invention.

The process of using a trigger geo-fence 110 to replace the set of geo-fences 130 and associated information 150 stored in the telematics device 10 on the asset is best shown by example, which is not intended to limit the scope of the invention. FIG. 2 is a map containing geo-fences corresponding to boundaries around customer facilities 170, fleet facilities 175, and routes between facilities 180. Each geo-fence 100 is defined by coordinates (e.g., GPS coordinates, latitude/longitude, or other coordinates depending on the geo-referencing system used) chosen to represent the geo-fence 100. A geo-fence around a facility 170, 175 may range in complexity from a circle or rectangle to a highly irregular shape which follows a complex perimeter around the facility. A geo-fence along or around a route 180 may range in complexity from a line or rectangle which approximates the route of travel to a highly irregular shape which more accurately follows the route. There are a number of methods for constructing these geo-fences which will be apparent to one skilled in the art. Geo-fences may also be constructed around routes 180 which fleet vehicles will be allowed to take without triggering an alert.

Trigger geo-fences are selected from the available defined geo-fences. A trigger geo-fence 110 is a geo-fence which has been designated as a fence that causes a new, pre-defined set of geo-fences to be sent from memory 80 linked to central station 70 through communication system 60 to telematics device 10, where they are stored in the memory 50 on the asset 5, if the asset is within the area defined by the trigger geo-fence. In one embodiment, a trigger geo-fence 110 is selected based on the requirement that an asset in an area heavily populated with geo-fences must travel trough this geo-fence to reach a different area which is also heavily populated with geo-fences. As seen in FIG. 2., Region A is heavily populated by geo-fences. Asset 5 traveling within this region would have the coordinates of the set of geo-fences corresponding to region A, and associated information on the geo-fences, in memory 50 on its telematics device 10. Region B, which is also heavily populated by geo-fences, is connected to Region A by two geo-fences, labeled R1 and R2, which are designated as trigger geo-fences 110. When asset 5 enters geo-fence R1 from Region A, the system and method of the invention cause a set of replacement geo-fences corresponding to Region B (which may include the fence for R1, or the fence for R1 already on the asset may simply be retained) to be placed in memory 50 on the asset 5. Similarly, when asset 5 enters geo-fence R2 from Region A, the system and method of the invention causes a set of replacement geo-fences corresponding to Region B to be placed in memory 50 on the asset 5. When asset 5 enters geo-fence R1 from Region B, the system and method of the invention causes a set of replacement geo-fences corresponding to Region A to be placed in memory 50 on the asset 5. Similarly, when asset 5 enters geo-fence R2 from Region B, the system and method of the invention causes a set of replacement geo-fences corresponding to Region A to be placed in memory 50 on the asset 5.

The example shown in FIG. 2 is only one example of the use of trigger geo-fences, and other embodiments, such as embodiments where different trigger geo-fences are used on either side of the boundary between two regions. In foregoing embodiments, it is desirable to have the system retain in the telemetrics system memory 50 the trigger geo-fence in which the asset is located at the time the request for an additional set (or part of a set) of geo-fences is made by the asset's telematics system. Alternatively, systems and methods may be used in which a trigger geo-fence triggers the updating of the set (or part of a set) of geo-fences stored in the telematics system memory when the asset leaves or enters the trigger geo-fence. The system and method for replacing the set of geo-fences stored in a memory device on the asset with a new set of geo-fences is further described below, with reference to FIG. 3.

Figure 3:
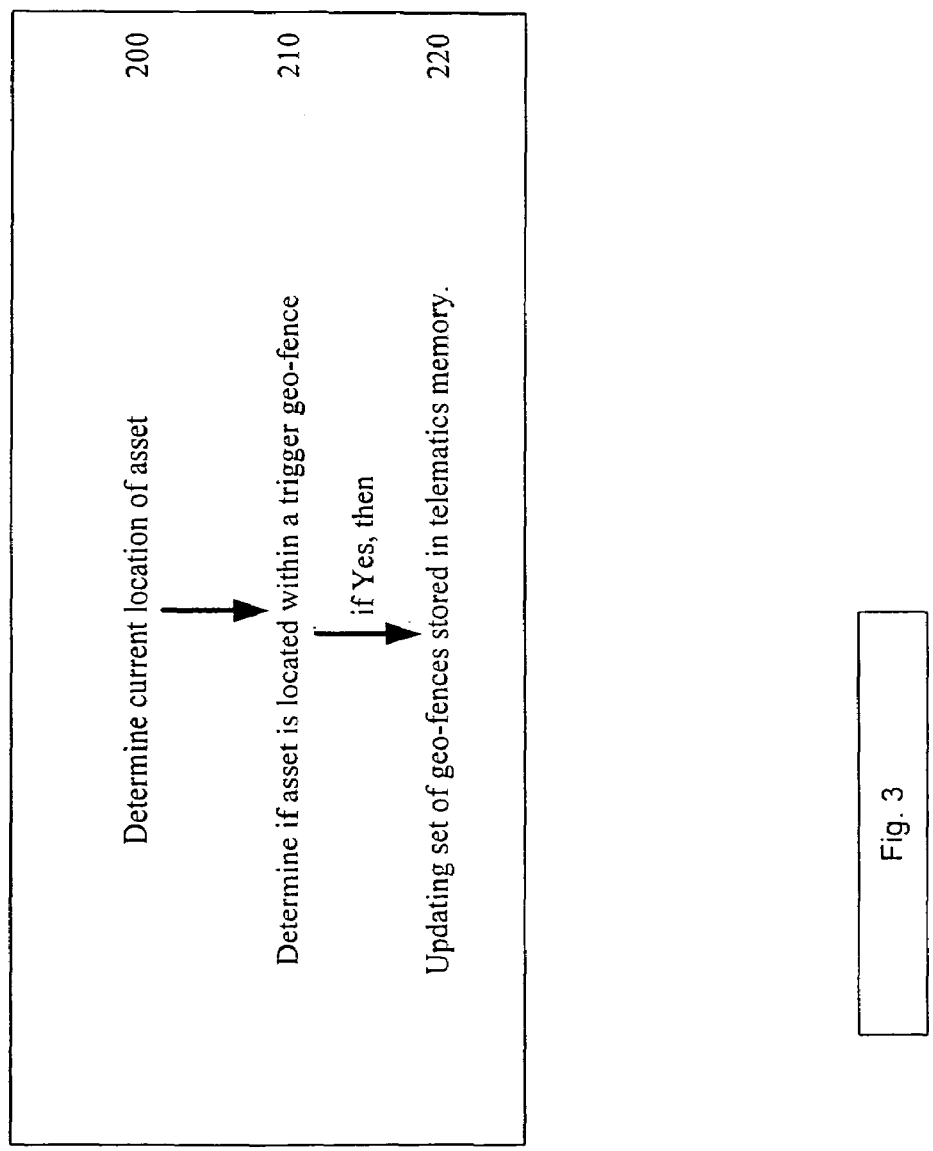
FIG. 3 is a schematic representation of the steps in the method of using the monitoring and tracking system of an embodiment of the present invention.

FIG. 3 is a diagram of the method of automatically replacing geo-fences within a telematics system. According to the method of the invention, the present location of a mobile asset is determined using the location device on the telematics system. Location device 20 is a position determining system, such as the Global Positioning System (GPS), Differential GPS (DGPS), Eurofix DGPS, and the Global Navigation Satellite System (GLONASS).

After the present location of the mobile asset is determined, a determination is made as to whether the present location of the asset is within the area defined by a trigger geo-fence stored in the telematics system memory. A set of geo-fences 125 is initially selected from the library of geo-fences 85 in memory 80 and is stored within the telematics memory 50. For example, a fleet dispatch manager may identify a permissible route to the taken by an asset 5 by defining a series of geo-fences along a predetermined route. The initially selected set of geo-fences are stored in memory 50 on asset 5. At least one of the geo-fences stored in the telematics system memory 50 is a trigger geo-fence.

Central processor 40 determines if the current location of the asset 5 is within the area defined by a geo-fence whose location is stored on the asset 130. To determine whether the asset is located within a particular geo-fence, the positional coordinates of the actual location of the asset is compared with the coordinates of the area defined by the geo-fence. If the location is not within the geo fence being considered, the processor 40 can compare the current location with another geo-fence stored in the memory 50 on the asset 5. This process can be continued until either a geo-fence is identified within which the asset is located, or it is determined that the asset is not within any of the geo-fences stored in the memory 50 on the asset 5. If the vehicle is not within any of the geo fences stored on the asset, notification of this may be sent to central station 70.

In another embodiment, when determining whether the location of an asset is within a geo-fence, it may desirable to avoid checking the current location against every possible geo-fence stored in memory on the asset. Thus, the comparison may begin with last geo-fence in which the asset was determined to have been located. If it is determined that the asset is no longer within that geo-fence, adjacent geo-fences may then be checked. Comparison of the current location of the asset with the location of geo-fences may then continue from geo-fence in which the asset was last present until either a geo-fence is found which contains the asset, or until all geo-fences have been checked, at which point an alert is sent to central station 70.

In another embodiment in which the current location of the asset is determined in relatively short time intervals and the geo-fence in which the asset is located is also determined in relatively short time intervals, it may be possible to assume that the asset could not have traveled across more than a certain number of geo-fences between consecutive comparisons. Accordingly, once the asset is found to no longer be located in a particular geo-fence, it may be possible that only a certain limited number of successive adjacent geo-fences need be checked before sending an alert. If the comparisons occur on a sufficiently regular basis, it might be sufficient to check only the next and previous geo-fences along the intended route of travel. In addition, it may be desirable in some instances to be able to detect if an asset backtracks on a route. In such a case, only the next adjacent segment, and not the previous segment, would be checked.

Figure 4:
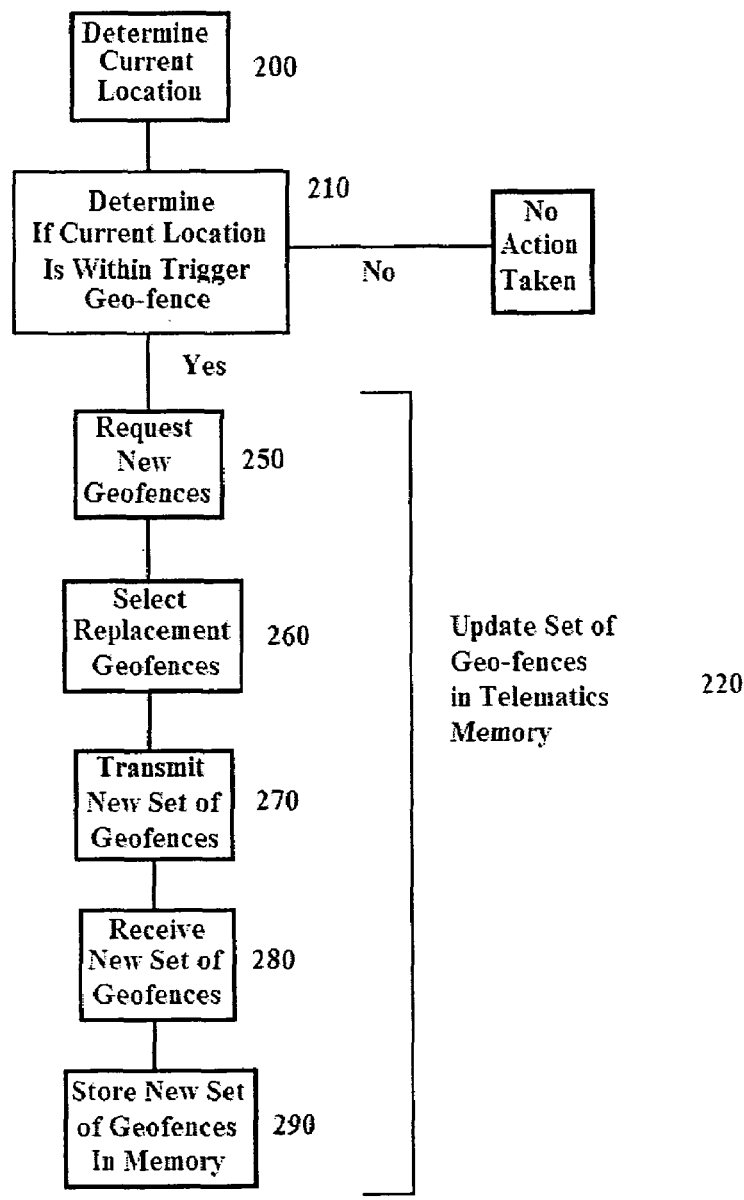
FIG. 4 is a block diagram of a method of controlling geo-fences on an asset.

If the asset is within the area defined by a trigger geo-fence stored in the telematics system memory, the set of geo-fences stored in the telematics system memory is updated. The updating may be performed by replacing the set of geo-fences stored in the telematics system memory with a set of geo-fences stored in the library of sets of geo-fences at the central station. In a more specific embodiment shown in FIG. 4, this updating is accomplished in several steps. First, the telematics device 10 transmits to the central station 70 a request for a replacement set of geo-fences. This request may also include the present location of the asset and information concerning the trigger geo-fence (such as the identity of the trigger geo-fence) in which the asset is located. Then, the central station 70 selects the replacement set of geo-fences based on the present location of the asset and the trigger geo-fence, and transmits the replacement set of geo-fences to the telematics device 10 via a wireless link between the telematics communications system 30 and the central station communications system 60. The telematics system then causes the replacement set of geo-fences to be placed in the telematics memory 50.

The selection of the replacement set of geo-fences may be made in numerous ways. In one embodiment, the selection can be based on a determination of the direction in which the asset is traveling, and then selecting the replacement set of geo-fences based on that determination. For example, a trigger geo-fence may be rectangular in shape extending east to west. If the present location of the asset indicates that the asset is located in the west portion of the trigger geo-fence, it may be determined that the asset is traveling from west to east if the present location is determined in relatively short time periods or if the present location is determined when an asset enters a new geo-fence. Based on this determination, a set of geo-fences that are east of the trigger geo-fence may be selected for transmission.

In another embodiment, the selection of replacement sets of geo-fences is based on a determination of which set of replacement geo-fences are most closely located to the current location of the asset and the region defined by the set of geo-fences already in the telematics system's memory. This embodiment would involve the steps of determining which sets of geo-fences in the library of geo-fences comprise a region that is adjacent to the region defined by the existing set of geo-fences within the asset's memory, then determining which of the sets of geo-fences in the library of geo-fences is closest in location to the present location of the asset. After those steps are performed, a replacement set of geo-fences from the library is chosen based upon which set of geo-fences in the library of geo-fences comprises a region that is adjacent to the first region and which set of geo-fences stored in the library of geo-fences is closest to the present location of the asset. This embodiment could be used where a number of sets of geo-fences are adjacent to set of geo-fences in which the asset is located.

Updating the set of geo-fences in the telematics system memory 50 may involve only replacing some of the geo-fences in the memory 50. This embodiment may be useful in a number of contexts, including where the telematics system is able to store a large number of geo-fences within a set, and it is desired to update those geo-fences on a piecemeal basis. This embodiment may also be useful in areas where there a high number of geo-fences that make it difficult to establish complete sets of geo-fences for replacement. Another situation where this embodiment may be useful is where the telematics communications system 30 is cellular based, and the area covered by the geo-fences is in a rural area where cellular reception is limited. In that situation, it may be desirable to update geo-fences on a piecemeal basis rather than updating them in whole sets.

Operational information for the telematics system may be associated with each geo-fence 150, such that particular operational information can be applied to the telematics system within each geo-fence. In one embodiment of the invention, operational information is associated with each geo-fence in set of geo-fences stored in the telematics system memory 50 and each geo-fence in the library of geo-fences 85. When the set of geo-fences in the telematics system memory 50 is updated, the replacement geo-fences and their associated operating parameters take the place of the geo-fences and associated operating parameters already in the telematics memory 50. In another embodiment, each geo-fence 100 is linked to a look-up table, or an equivalent, containing all of the operational parameters, and the look-up table is permanently placed in a memory 50 in a telematics device 10 on the asset 5. In this embodiment, codes corresponding to operating parameters in the look-up table, or an equivalent, may be associated with each geo-fence rather the actual operating parameters, resulting in decreased memory usage. Operational information associated with each geo-fence 150 may include, but is not limited to, frequency of determining the locating the asset; determination is notification of central station 70, or some other contact is required; contingency actions 160 to be taken when the asset is determined to be outside of a geo-fence.

If the asset 5 is not within a geo-fence whose location is stored on the asset, a predetermined contingency action 160 may be implemented. One type of contingency action may be the transmittal of an alert from the telematics device 10 to central station 70. This transmittal may also include the unique identification of the asset 5. The alert may be selected from a schedule of proximity actions, each varying in degree of urgency or indication of relative distance or time, among other parameters. At one level of action, the fleet dispatch manager can contact the driver of the vehicle to inquire about the nature of the deviation from the predefined route. Other contingency actions may include activating an automatic telephone messaging service, triggering a pager, or otherwise reporting the event to the user.

This system and the accompanying methods can have vast implications with regard to homeland security in that they can provide an automated system that requires minimal human intervention to help prevent, or rapidly recover, vehicles carrying hazardous, dangerous, or valuable cargo from being stolen. Similarly, they can prevent, or allow the rapid recovery of, vehicles themselves from being stolen or used for unauthorized or illegal purposes.

It is to be understood that the present invention is not limited to the embodiments described above, but encompasses any and all embodiments within the scope of the following claims.

What is claimed is:

1. A method of automatically updating a set of geo-fences stored in the memory of a telematics system on a mobile asset that is wirelessly linked to a central station, wherein the telematics system has a location device and wherein one or more of the geo-fences of the set of geo-fences stored in the telematics system memory is a trigger geo-fence, comprising:

determining the present location of the mobile asset with the location device;

determining at the asset whether the present location of the mobile asset is located within the area defined by one of the one or more trigger geo-fences stored in the telematics system memory; and if the mobile asset is located within the area defined by one of the trigger geo-fences stored in the telematics system memory, updating via the wireless link the set of geo-fences stored in the telematics system memory based upon the present location of the asset and the trigger geo-fence within which the asset is located, by:

determining a general direction the asset is traveling based upon the present location of the asset within the area defined by the trigger geo-fence within which the asset is located;

selecting a replacement set of geo-fences based upon the general direction of the asset, such that the selected replacement set of geo-fences corresponds to areas in the general direction in which the asset is heading; and replacing the set of geo-fences stored in the telematics system memory with the replacement set of geo-fences;

wherein the replacement set of geofences is selected from a library of sets of geo-fences stored on a storage device at the central station wherein at least one of the geo-fences in each of the sets of geo-fences in the library of geo-fences is a trigger geo-fence.

2. The method of claim 1:

wherein the set of geo-fences in the storage device on the asset is comprised of geo-fences that are proximate to each other within a first region;

wherein each of the sets of geo-fences stored in the library of geo-fences is comprised of geo-fences that are proximate to each other within a region;

wherein updating the set of geo-fences stored in the telematics system memory based upon the location of the asset and the trigger geo-fence within which the asset is located further comprises:

determining which set of geo-fences in the library of geo-fences comprises a region that is adjacent to the first region;

determining which set of geo-fences stored in the library of geo-fences is closest to the present location of the asset; and selecting a replacement set of geo-fences from the library of geo-fences based upon which set of geo-fences in the library of geo-fences comprises a region that is adjacent to the first region and which set of geo-fences stored in the library of geo-fences is closest to the present location of the asset.

3. The method of claim 1, wherein updating the set of geo-fences stored in the telematics system memory further comprises:

transmitting from the telematics system on the asset to the central station via the wireless link a request for a replacement set of geo-fences if the mobile asset is located within the area defined by a trigger geo-fence stored in the telematics system memory, wherein the request also includes the present location of the asset and information concerning the trigger geo-fence within which the asset is presently located;

selecting a replacement set of geo-fences based upon the present location of the asset and information concerning the geo-fence within which the asset is presently located;

transmitting from the central station to the telematics system on the asset via the wireless link the replacement set of geo-fences; and storing the replacement set of geo-fences in the telematics system memory by replacing the set of geo-fences already stored in the telematics system memory with the replacement set of geo-fences.

4. The method of claim 1, wherein operating parameter data for the telematics system is associated with at least one of the geo-fences in the set of geo-fences stored in the telematics system memory;

wherein operating parameter 4ata for the telematics system is associated with at least one of the geo-fences in each set of geo-fences stored in the library of geo-fences; and wherein updating the set of geo-fences stored in the telematics system memory further includes replacing the operating parameter data associated with the geo-fences stored in the telematics system memory with operating parameter data associated with the geo-fences of the replacement set of geo-fences.

5. The method of claim 4, further comprising setting, for geo-fences having associated operating parameter data, the operating parameters for the telematics system using the operating parameter data associated with the geo-fence in which the asset is located.

6. The method of claim 4, wherein the operating parameter data associated with at least one geo-fence having associated operating parameter data comprises the frequency of determining the present location of the asset.

7. The method of claim 4, wherein the operating parameter data associated with at least one geo-fence having associated operating parameter data comprises the frequency of transmitting information from the asset to the central station.

8. The method of claim 4, wherein the operating parameter data associated with at least one geo-fence having associated operating parameter data comprises the frequency of sensing a condition of the asset using a sensor on the asset.

9. The method of claim 7, wherein the conditions sensed on the asset are selected from the group of temperature, motion, door position, valve condition, impact, speed, acceleration, and the presence of cargo in the asset.

10. The method of claim 4, wherein the operating parameter data associated with at least one geo-fence having associated operating parameter data comprises information relating to a rule to be applied by the telematics system.

11. The method of claim 1, wherein the present location of the asset is determined periodically.

12. The method of claim 1, further comprising determining whether the asset is located within the area defined by any geo-fence stored in the storage device on the asset, and providing an alert if the asset is not located within the area defined by a geo-fence stored in the storage device on the asset.

13. The method of claim 1, further comprising determining whether the asset is exiting a geo-fence stored in the storage device on the asset and providing an alert if the asset is entering an area not defined by a geo-fence stored in the storage device on the asset.

14. The method of claim 1, wherein each member of the set of geo-fences stored on the asset corresponds to either a facility to which the asset might travel or a geographical route between facilities along which the asset might travel.

15. The method of claim 1, wherein each member of the sets of geo-fences stored in the library of sets of geo-fences at the central station corresponds to either a facility to which the asset might travel or a geographical route between facilities along which the asset might travel.

16. The method of claim 1, wherein the asset has a unique identifier; and wherein updating via the wireless link the set of geo-fences stored in the telematics system memory is also based upon the unique identifier of the asset.

17. The method of claim 1, further including retaining the trigger geo-fence in the telematics system memory when the set of geo-fences stored in the telematics system memory is updated.

18. The method of claim 1, wherein determining at the asset whether the present location of the mobile asset is located within the area defined by one of the trigger geo-fences stored in the telematics system memory comprises determining whether the asset has entered the area defined by one of the trigger geo-fences stored in the telematics system memory.

19. A system for automatically updating a set of geo-fences on a mobile asset, the system comprising:

an asset having a telematics system having memory, a locating device, and a wireless asset communications system for sending and receiving messages, wherein a set of geo-fences is stored in the telematics memory and wherein one or more of the geo-fences is a trigger geo-fence;

a central station having a library of sets of geo-fences and a central station wireless communications system for sending and receiving messages, wherein at least one geo-fence in each set of geo-fences in the library is designated as a trigger geo-fence;

wherein the locating device determines the present location of the asset, wherein the telematics system determines whether the present location of the asset is within the area defined by one of geo-fences of the set of geo-fences stored in the telematics memory;

wherein the telematics system causes the set of geo-fences in the telematics memory to be updated if the asset is located within the area defined by one of the one or more trigger geo-fences stored on the telematics memory; and wherein the set of geo-fences in the telematics memory is updated by;

determining a general direction the asset is traveling based upon the present location of the asset within the area defined by the trigger geo-fence within which the asset is located;

selecting a replacement set of geo-fences from the library of sets of geo-fences based upon the general direction of the asset, such that the selected replacement set of geo-fences corresponds to areas in the general direction in which the asset is heading; and replacing the set of geo-fences in the telematics memory with the replacement set of geo-fences.

20. The system of claim 19,
wherein operating parameter data for the telematics system is associated with at least one geo-fence in the set of geo-fences stored on the telematics memory;
wherein operating parameter data for the telematics system is associated with at least one geo-fence stored in the library of sets of geo-fences; and
wherein causing the set of geo-fences stored in the telematics memory to be updated in system memory further includes replacing any operating parameter data associated with each geo-fence stored in the telematics system memory with any operating parameter data associated with the geo-fences of the replacement set of geo-fences,
wherein causing the set of geo-fences in the telematics memory to be updated further includes replacing operating parameter data associated with the geo-fences stored in the telematics system memory with operating parameter data associated with the geo-fences of the replacement geo-fences.

21. The system of claim 20, further comprising setting, for geo-fences having associated operating parameter data, the operating parameters for the telematics system using the operating parameter data associated with the geo-fence in which the asset is located.

22. The system of claim 20, further comprising at least one sensor on the asset for sensing a condition of the asset, wherein the operating parameter data associated with each geo-fence having associated parameter data comprises the frequency of sensing conditions of the asset using the at least one sensor.

23. The system of claim 22, wherein the at least one sensor is selected from the group of temperature sensor, motion sensor, door position sensor, valve condition sensor, impact sensor, speed sensor, acceleration sensor, and contents sensor.

\* \* \* \* \*